(12) United States Patent
Gupta et al.

(10) Patent No.: US 10,949,706 B2
(45) Date of Patent: Mar. 16, 2021

(54) FINDING COMPLEMENTARY DIGITAL IMAGES USING A CONDITIONAL GENERATIVE ADVERSARIAL NETWORK

(71) Applicant: Microsoft Technology Licensing, LLC, Redmond, WA (US)

(72) Inventors: Mithun Das Gupta, Hyderabad (IN); Sudhir Kumar, Hyderabad (IN); Rushabh Rajesh Gandhi, Hyderabad (IN); Soudamini Sreepada, Hyderabad (IN); Naresh Annam, Hyderabad (IN); Shashank Verma, Jaipur (IN); Jagjot Singh, Lucknow (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 162 days.

(21) Appl. No.: 16/249,243

(22) Filed: Jan. 16, 2019

(65) Prior Publication Data
US 2020/0226411 A1   Jul. 16, 2020

(51) Int. Cl.
*G06K 9/62*   (2006.01)
*G06K 9/00*   (2006.01)
(Continued)

(52) U.S. Cl.
CPC ......... *G06K 9/6201* (2013.01); *G06F 3/0484* (2013.01); *G06F 16/532* (2019.01);
(Continued)

(58) Field of Classification Search
CPC .... G06K 9/6201; G06K 9/6262; G06F 16/54; G06F 16/532; G06F 3/0484; G06Q 30/0631; G06Q 30/0641
See application file for complete search history.

(56) References Cited

U.S. PATENT DOCUMENTS 7,305,415 B2 * 12/2007 Vernau ............... G06F 16/30
7,366,682 B1 *  4/2008 Katiyar .............. G06Q 30/02
                                                    705/14.51
(Continued)

FOREIGN PATENT DOCUMENTS

CN      107392255 A      11/2017
WO     2019/011936 A1    1/2019

OTHER PUBLICATIONS

Al-Halah, et al., "Fashion Forward: Forecasting Visual Style in Fashion," in arXiv:1705.06394v2 [cs.CV], Aug. 3, 2017, 12 pages.
(Continued)

*Primary Examiner* — Dominic E Rego

(57) ABSTRACT

A computer-implemented technique is described herein for retrieving at least one recommended output image. In one implementation, the technique uses a generator component to transform first-part image information, associated with a first-part image selected by a user, into one or more instances of second-part generated image information. Each instance of the second-part generated image information complements the first-part image information. The generator component is trained by a computer-implemented training system using a conditional generative adversarial network (cGAN). The technique further includes: retrieving one or more second-part output images from a data store based on the instance(s) of second-part generated image information; generating a user interface presentation that presents the first-part image and the second-part output image(s); and displaying the user interface presentation on a display device. In one example, the first-part image and the second-part output images show complementary apparel items.

23 Claims, 10 Drawing Sheets

(51) Int. Cl.
*G06F 16/54* (2019.01)
*G06F 3/0484* (2013.01)
*G06Q 30/06* (2012.01)
*G06F 16/583* (2019.01)
*G06F 16/532* (2019.01)

(52) U.S. Cl.
CPC ........... *G06F 16/54* (2019.01); *G06K 9/6262* (2013.01); *G06Q 30/0631* (2013.01); *G06Q 30/0641* (2013.01)

(56) References Cited

U.S. PATENT DOCUMENTS

| | | | | |
|---|---|---|---|---|
| 8,055,639 | B2* | 11/2011 | Rotholtz | G06Q 30/0625 707/706 |
| 8,285,602 | B1* | 10/2012 | Yi | G06Q 30/00 705/26.7 |
| 8,290,818 | B1* | 10/2012 | Levitan | G06Q 30/0631 705/26.7 |
| 8,392,281 | B1* | 3/2013 | Bashir | G06Q 30/02 705/26.7 |
| 8,719,962 | B1* | 5/2014 | Huff | A41D 13/00 2/69 |
| 9,613,360 | B1* | 4/2017 | Strand | G06Q 30/0241 |
| 9,665,881 | B1* | 5/2017 | Ward | G06Q 30/0239 |
| 10,074,200 | B1 | 9/2018 | Yeturu | |
| 10,102,559 | B1* | 10/2018 | Jain | G06Q 30/0631 |
| 10,185,927 | B1* | 1/2019 | Seyhan | G06Q 10/087 |
| 10,346,893 | B1* | 7/2019 | Duan | G06F 16/287 |
| 2003/0012436 | A1* | 1/2003 | Lyford | G06T 11/001 382/167 |
| 2006/0242011 | A1* | 10/2006 | Bell | G07G 1/0054 705/14.25 |
| 2008/0294617 | A1* | 11/2008 | Chakrabarti | G06F 16/9535 |
| 2011/0010232 | A1* | 1/2011 | Bhojwani | G06Q 40/02 705/14.17 |
| 2013/0031694 | A1* | 2/2013 | Foster | A41D 1/04 2/69 |
| 2013/0208305 | A1* | 8/2013 | Epstein | G06Q 30/06 358/1.15 |
| 2013/0297424 | A1* | 11/2013 | Baca | G06Q 30/0611 705/14.58 |
| 2014/0258016 | A1* | 9/2014 | Hale | G06Q 30/0631 705/26.3 |
| 2014/0279294 | A1* | 9/2014 | Field-Darragh | H04B 5/0062 705/28 |
| 2015/0142606 | A1* | 5/2015 | Hafeez | G06Q 30/0625 705/26.62 |
| 2015/0161674 | A1* | 6/2015 | Khoury | H04L 51/10 705/14.66 |
| 2015/0209015 | A1* | 7/2015 | Oh | A61B 8/463 600/440 |
| 2015/0287215 | A1* | 10/2015 | Ohba | H04N 13/128 382/103 |
| 2016/0019832 | A1* | 1/2016 | Nakanishi | G09G 5/02 345/690 |
| 2016/0071187 | A1* | 3/2016 | Bhosle | G06Q 30/0641 705/26.7 |
| 2016/0148343 | A1* | 5/2016 | Yan | G06T 7/11 345/660 |
| 2016/0180193 | A1* | 6/2016 | Masters | G06K 9/3216 382/218 |
| 2016/0360125 | A1* | 12/2016 | Yamamoto | A61B 1/05 |
| 2017/0015095 | A1* | 1/2017 | Hoffman, Jr. | B41F 15/34 |
| 2017/0070691 | A1* | 3/2017 | Nishikido | H04N 5/35581 |
| 2018/0068139 | A1* | 3/2018 | Aalund | G06K 9/20 |
| 2018/0137201 | A1* | 5/2018 | Longbin | G06F 16/285 |
| 2018/0137551 | A1 | 5/2018 | Zheng et al. | |
| 2018/0213162 | A1* | 7/2018 | Tsutsumitake | G06T 11/60 |
| 2018/0285958 | A1* | 10/2018 | Bender | G06Q 30/0631 |
| 2018/0374249 | A1 | 12/2018 | Colbert et al. | |
| 2019/0027147 | A1 | 1/2019 | Diamant et al. | |
| 2019/0325620 | A1* | 10/2019 | Adler | G06T 7/10 |
| 2019/0370879 | A1* | 12/2019 | Bhattacharjee | G06N 3/0454 |
| 2019/0378267 | A1* | 12/2019 | Giering | G06K 9/6289 |
| 2020/0005511 | A1* | 1/2020 | Kavidayal | G06N 3/088 |
| 2020/0071674 | A1* | 3/2020 | Kim | G01N 33/50 |

OTHER PUBLICATIONS

Goodfellow, et al., "Generative Adversarial Nets," in arXiv:1406.2661v1 [stat.ML], Jun. 10, 2014, 9 pages.
Han, et al., "Learning Fashion Compatibility with Bidirectional LSTMs," in Proceedings of the 25th ACM International Conference on Multimedia, Oct. 2017, pp. 1078-1086.
He, et al., "VBPR: Visual Bayesian Personalized Ranking from Implicit Feedback," in Proceedings of the Thirtieth AAAI Conference on Artificial Intelligence (AAAI-16), 2016, pp. 144-150.
Hisiao, et al., "Learning the Latent 'Look': Unsupervised Discovery of a Style-Coherent Embedding from Fashion Images," in arXiv:1707.03376v2 [cs.CV], Aug. 3, 2017, 9 pages.
Hu, et al., "Collaborative Fashion Recommendation: A Functional Tensor Factorization Approach," in Proceedings of the 23rd ACM International Conference on Multimedia, Oct. 2015, pp. 129-138.
Iwata, et al., "Fashion Coordinates Recommender System Using Photographs from Fashion Magazines," in Proceedings of the Twenty-Second International Joint Conference on Artificial Intelligence, 2011, pp. 2262-2267.
Jagadeesh, et al., "Large Scale Visual Recommendations from Street Fashion Images," in Proceedings of the 20th ACM SIGKDD International Conference on Knowledge Discovery and Data Mining, KDD '14, Aug. 2014, pp. 1925-1934.
Kiapour, "Hipster Wars: Discovering Elements of Fashion Styles," in ECCV 2014, Lecture Notes in Computer Science, vol. 8689. Springer, 2014, pp. 472-488.
Kovashka, et al., "Whittlesearch: Image Search with Relative Attribute Feedback," in arXiv:1505.04141v2 [cs.CV], May 18, 2015, 26 pages.
Ledig, et al., "Photo-Realistic Single Image Super-Resolution Using a Generative Adversarial Network," in arXiv:1609.04802v5 [cs.CV], May 25, 2017, 19 pages.
Lee, et al., "Style2Vec: Representation Learning for Fashion Items from Style Sets," in arXiv:1708.04014v1 [cs.CV], Aug. 14, 2017, 6 pages.
Li, et al., "Mining Fashion Outfit Composition Using an End-to-End Deep Learning Approach on Set Data," in arXiv:1608.03016v2 [cs.MM], Apr. 15, 2017, 10 pages.
Lin, et al., "Explainable Fashion Recommendation with Joint Outfit Matching and Comment Generation," in arXiv:1806.08977v2 [cs.IR], Dec. 3, 2018, 14 pages.
Liu, et al., "'Hi, Magic Closet, Tell Me What to Wear!'," in Proceedings of the 20th ACM International Conference on Multimedia, Nov. 2012, pp. 619-628.
Liu, et al., "Deep Learning Face Attributes in the Wild," in arXiv:1411.7766v3 [cs.CV], Sep. 24, 2015, 11 pages.
Matzen, et al., "Streetstyle: Exploring World-Wide Clothing Styles From Millions of Photos," in arXiv:1706.01869v1 [cs.CV], Jun. 6, 2017, 13 pages.
McAuley, et al., "Image-Based Recommendations on Styles and Substitutes," in Proceedings of the 38th International ACM SIGIR Conference on Research and Development in Information Retrieval, Aug. 2015, pp. 43-52.
Mirza, et al., "Conditional Generative Adversarial Nets," in arXiv:1411.1784v1 [cs.LG], Nov. 6, 2014, 7 pages.
Ren, et al., "Faster R-CNN: Towards Real-Time Object Detection with Region Proposal Networks," in NIPS, 2015, 9 pages.
Sajjadi, et al., "Tempered Adversarial Networks," in arXiv:1802.04374v4 [stat.ML], Jul. 11, 2018, 9 pages.
Simo-Serra, et al., "Fashion Style in 128 Floats: Joint Ranking and Classification Using Weak Data for Feature Extraction," in 2016 IEEE Conference on Computer Vision and Pattern Recognition (CVPR), 2016, pp. 298-307.
Simonyan, et al., "Very Deep Convolutional Networks for Large-Scale Image Recognition," in arXiv:1409.1556v6 [cs.CV], Apr. 10, 2015, 14 pages.

(56) References Cited

OTHER PUBLICATIONS

Song et al., "NeuroStylist: Neural Compatibility Modeling for Clothing Matching," in MM'17, Oct. 2017, pp. 753-761.

Veit, et al., "Learning Visual Clothing Style with Heterogeneous Dyadic Co-occurrences," in Proceedings of the 2015 IEEE International Conference on Computer Vision (ICCV), ICCV '15, 2015, pp. 4642-4650.

Zhao, et al., "Memory-Augmented Attribute Manipulation Networks for Interactive Fashion Search," in 2017 IEEE Conference on Computer Vision and Pattern Recognition (CVPR), 2017, pp. 1520-1528.

Howard, et al., "MobileNets: Efficient Convolutional Neural Networks for Mobile Vision," in arXiv:1704.04861v1 [cs.CV], Apr. 17, 2017, 9 pages.

He, et al., "Deep Residual Learning for Image Recognition," in arXiv:1512.03385v1 [cs.CV], Dec. 10, 2015, 12 pages.

Szegedy, et al., "Going Deeper with Convolutions," in arXiv:1409.4842v1 [cs.CV], Sep. 17, 2014, 12 pages.

Kumar, et al., "c+GAN: Complementary Fashion Item Recommendation," arXiv:1906.05596v1 [cs.CV], Jun. 13, 2019, 9 pages.

Liu, et al., "DeepFashion: Powering Robust Clothes Recognition and Retrieval with Rich Annotations," available at https://www.cv-foundation.org/openaccess/content_cvpr_2016/papers/Liu_DeepFashion_Powering_Robust_CVPR_2016_paper.pdf, in IEEE Conference on Computer Vision and Pattern Recognition (CVPR), CVPR reprint, 2016, 9 pages.

Pathak, et al., "Context Encoders: Feature Learning by Inpainting," arXiv:1604.07379v2 [cs.CV], Nov. 21, 2016, 12 pages.

Salimans, et al., "Improved Techniques for Training GANs," arXiv:1606.03498v1 [cs.LG], Jun. 10, 2016, 10 pages.

Zheng, et al., "ModaNet: A Large-Scale Street Fashion Dataset with Polygon Annotations," in Proceedings of the 26th ACM International Conference on Multimedia (MM '18), Oct. 2018, pp. 1670-1678.

PCT Search Report and Written Opinion for PCT Application No. PCT/US2019/065316, dated Feb. 27, 2020, 18 pages.

Google translation of Chinese Published Patent Application No. 107392255, accessed on Apr. 6, 2020, 9 pages.

Chen, et al., "Dress Fashionably: Learn Fashion Collocation With Deep Mixed-Category Metric Learning," available at https://pdfs.semanticscholar.org/7490/a6ed3404c459f9d428a7e640f8d3a42a21a9.pdf, retrieved on Feb. 17, 2020, in AAAI Conference on Artificial Intelligence, 2018, pp. 2103-2110.

* cited by examiner

OVERVIEW OF OPERATION OF THE TRAINING SYSTEM 902

IDENTIFY, USING A MATCHING COMPONENT, A SET OF COMPOSITE IMAGES, EACH COMPOSITE IMAGE BEING COMPOSED OF AT LEAST A FIRST-PART IMAGE AND A SECOND-PART IMAGE.
904

SEGMENT THE COMPOSITE IMAGES TO GENERATE A PLURALITY OF FIRST-PART EXTRACTED IMAGES AND A PLURALITY OF SECOND-PART EXTRACTED IMAGES.
906

USE A CONDITIONAL GENERATIVE ADVERSARIAL NETWORK (cGAN) TO TRAIN A GENERATOR COMPONENT BASED ON THE PLURALITY OF FIRST-PART EXTRACTED IMAGES AND THE PLURALITY OF SECOND-PART EXTRACTED IMAGES.
908

NEXT INSTANCE

USE THE GENERATOR COMPONENT TO MAP AN INSTANCE OF FIRST-PART IMAGE INFORMATION, TOGETHER WITH AN INSTANCE OF RANDOM INFORMATION TAKEN FROM A DISTRIBUTION, INTO AN INSTANCE OF SECOND-PART GENERATED IMAGE INFORMATION.
910

USE A DISCRIMINATOR COMPONENT TO PROVIDE A SCORE WHICH REFLECTS A LEVEL OF CONFIDENCE THAT THE INSTANCE OF SECOND-PART GENERATED IMAGE INFORMATION IS REPRESENTATIVE OF A REAL PREEXISTING SECOND-PART IMAGE.
912

BASED AT LEAST ON THE SCORE, ADJUST WEIGHT VALUES OF THE GENERATOR COMPONENT AND THE DISCRIMINATOR COMPONENT.
914

FIG. 9

FINDING COMPLEMENTARY DIGITAL IMAGES USING A CONDITIONAL GENERATIVE ADVERSARIAL NETWORK

BACKGROUND

Computing systems often employ recommendation engines to suggest one or more digital items, given a user's selection of an initial digital item. In a common strategy, a recommendation engine may regard digital items as related based on a consideration of click count information. For example, the recommendation engine can determine that two digital items are related if many users who click on (or otherwise interact with) a first digital item also click on a second digital item. This measure of relatedness, however, is noisy because it encompasses a variety of reasons why users have interacted with the digital items. This measure of relatedness is therefore not sufficiently nuanced to pinpoint those occasions in which a user is attempting to find two complementary digital items, e.g., as when the user is attempting to find images of complementary items of apparel.

SUMMARY

A computer-implemented technique is described herein for retrieving at least one recommended output image. In one implementation, the technique uses a machine-trained generator component to transform first-part image information, associated with a first-part image selected by a user, into one or more instances of second-part generated image information. Each instance of the second-part generated image information complements the first-part image information. The generator component is trained by a computer-implemented training system using a conditional generative adversarial network (cGAN). The technique further includes: retrieving one or more second-part output images from a data store based on the instance(s) of second-part generated image information; generating a user interface presentation that presents the first-part image and the second-part output image(s); and displaying the user interface presentation on a display device.

In one implementation, the first-part image shows a first apparel item selected by a user (such as a pair of pants), and each second-part output image shows a second apparel item that complements the first apparel item (such as a shirt, jacket, blouse, etc.). More generally, the first-part image and each second-part output image can show any complementary image content, such as complementary furniture items, décor items, automotive parts, etc.

In one implementation, the training system produces the generator component by: identifying a set of composite images, each composite image being composed of at least a first-part image and a complementary second-part image; segmenting the composite images to generate a plurality of first-part extracted images and a plurality of second-part extracted images; and using the cGAN to train the generator component based on the plurality of first-part extracted images and the plurality of second-part extracted images.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 9 is a flowchart that shows one illustrative manner of operation of the training system of FIG. 1.

Figure 1:
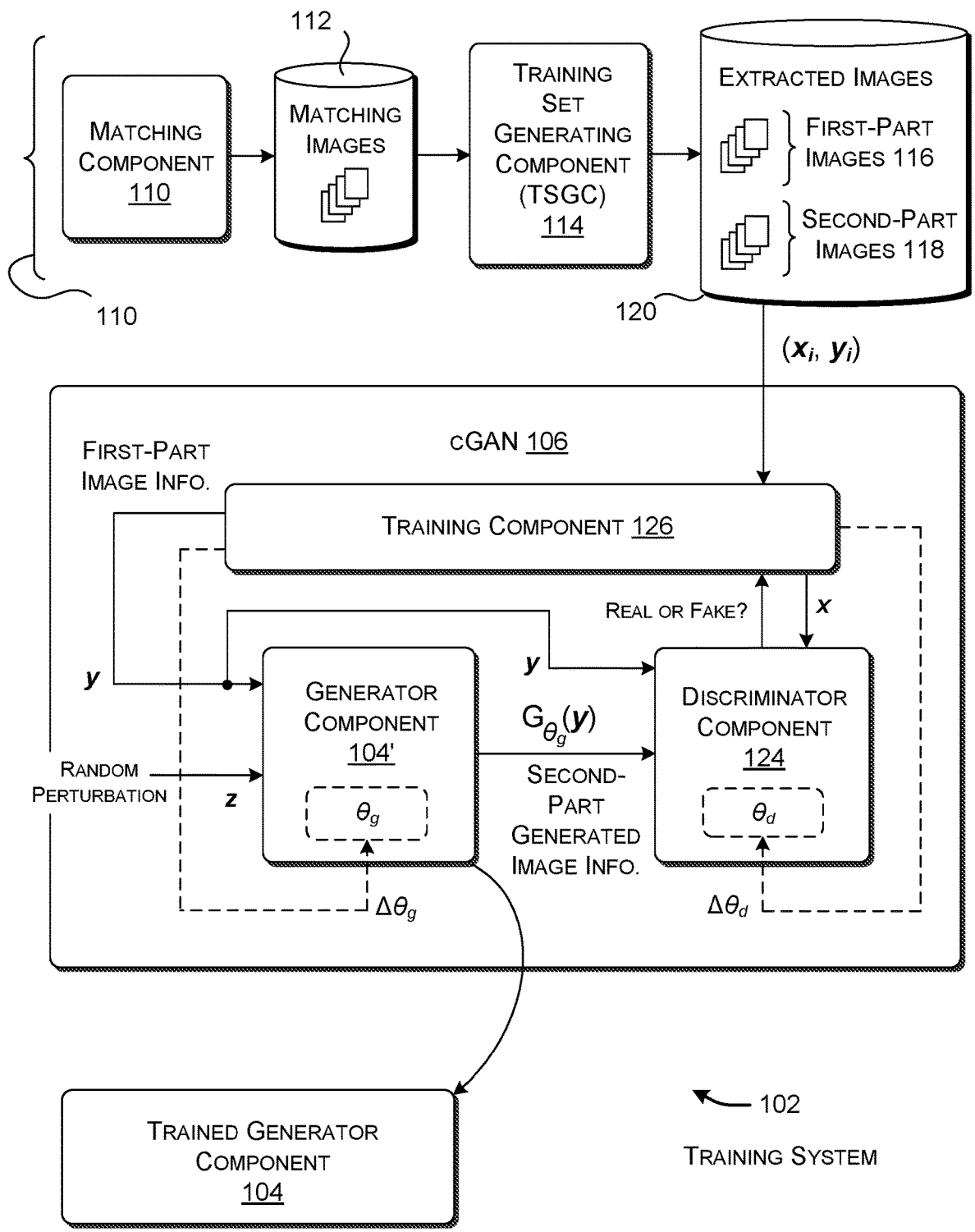
FIG. 1 shows an illustrative training system for producing a trained generator component. The training system performs this task using a conditional generative adversarial network (cGAN).

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes computing systems for training a generator component and using the generator component to recommend images, given a selected input image. Section B sets forth illustrative methods which explain the operation of the computing systems of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry. Each of the terms "component" and "engine" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Systems

FIG. 1 shows an illustrative training system 102 for producing a trained generator component 104. The training system 102 performs this task using a conditional generative adversarial network (cGAN) 106. A recommendation-generating system, shown in FIG. 2 and described below, uses the trained generator component 104 to map a received input image into one more other images that complement the input image. That is, in the terminology used herein, the recommendation-generating system maps a selected first-part image to one or more second-part images, wherein each second-part image complements the first-part image.

In most of the illustrative examples presented here, the first-part image shows a selected apparel item (such as a pair of pants), and the complementary second-part images show complementary apparel items (such as various shirts, jackets, blouses, etc. that are determined to go well with the selected pair of pants). In another case, the selected first-part image shows a selected furniture item (such as a couch), and the complementary second-part images show complementary furniture items (such as end tables, coffee tables, etc.). In another case, the selected first-part image shows a home décor item (such as a vase), and the complementary second-part images show complementary décor items (such as wall hangings, etc.). In another case, the selected first-part image shows a selected automotive part (such as a selected seat style), and the complementary second-part images show complementary automotive parts (such as dashboard veneers, etc.), and so on. The above-described cases are provided by way of example, not limitation.

Further note that FIG. 1 shows that the training system 102 only produces a single generator component 104. But, in practice, the training system 102 can produce a plurality of generator components. Each generator component maps between different pairings of image content types. For example, a first generator component can suggest shirts given a selected pair of pants, while a second generator component can suggest pants given a selected shirt. A third generator component can suggest pants given a selected pair of shoes, and so on. The recommendation-generating engine can leverage any number of such generator components to generate its recommendations, depending on how it is configured.

The training system 102 includes preprocessing functionality 108 for producing a corpus of training images. The cGAN 106 subsequently uses the training images to produce the generator component 104. As a first phase, a matching component 110 retrieves an initial set of matching images, each of which includes a first-part image and a complementary second-part image. For instance, the matching component 110 can retrieve an initial set of images of human subjects, each of which includes a first-part image that shows pants worn by the human subject, and a second-part image that shows a shirt worn by the human subject. In one case, the matching component 110 performs its function by submitting one or more search queries to a search engine, such as the BING search engine provided by MICROSOFT CORPORATION of Redmond, Wash. The search engine then retrieves the initial set of matching images from data stores associated with a wide area network, such as the Internet. Without limitation, the matching component 110 can submit the following queries: (1) "men's fall fashion"; (2) "men's fall fashion 2018"; (3) "women's fall fashion"; (4) "women's latest fall fashion," etc. As indicated by these query examples, a model developer can cull a targeted set of initial matching images by crafting the input queries in an appropriate manner. That is, the model developer can choose queries that pinpoint the subject matter of the images that are being sought, the dates associated with the images being sought, and so on. The matching component 110 stores the initial set of matching images in a data store 112.

Figure 4:
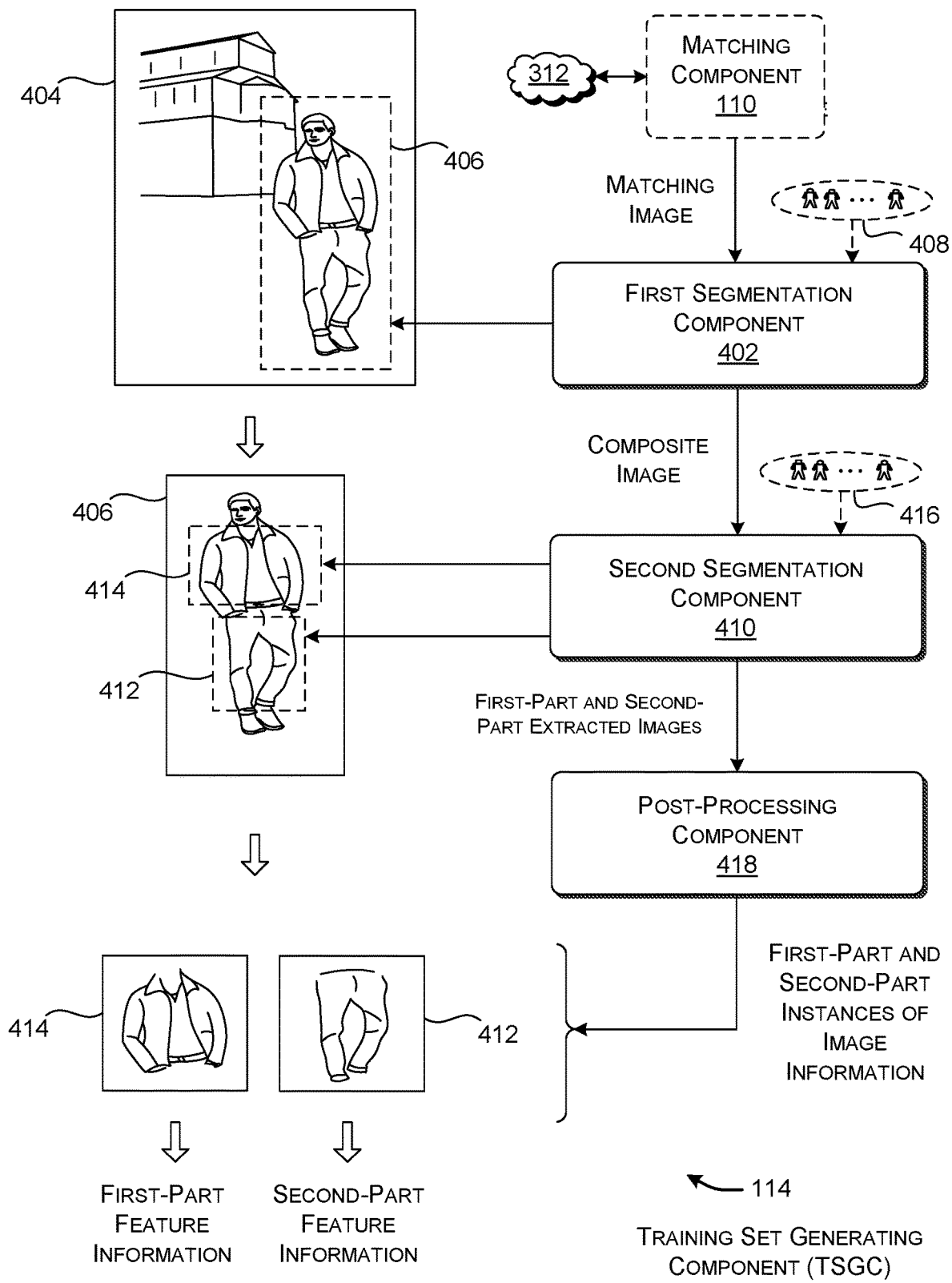
FIG. 4 shows illustrative aspects of the training system of FIG. 1.

A training set generating component (TSGC) 114 generates a training corpus based on the initial set of matching images. FIG. 4 will describe the operation of this component in detail. By way of overview here, the TSGC 114 first extracts a plurality of composite images from the set of initial matching images. Each composite image includes a first-part image and a second-part image. For example, each composite image corresponds to that portion of an initial matching image that shows a complete body of a human subject, excluding other parts of the initial matching image which do not pertain to the subject's body. The TSGC 114 then extracts a plurality of first-part images (such as images showing pants) and a plurality of second-part images (such as images showing shirts) from the composite images. These extracted images are referred to respectively herein as first-part extracted images 116 and second-part extracted images 118. The TSGC 114 can optionally perform other processing on the extracted images, such as by centering the images, normalizing the images, compressing the images, etc.

A data store 120 stores the first-part extracted images 116 and the second-part extracted images 118. Alternatively, the TSGC 114 can convert the images into feature information, e.g., using a deep neural network (DNN). The data store 120 can then store the feature information associated with each extracted image, in lieu of, or in addition to, the extracted image itself. The data store 120 may represent each instance of feature information as a feature vector.

More generally, the term "first-part image information" is used herein to refer to either the pixels associated with a first-part image, or some kind of feature-space representation of the first-part image, such as a vector which describes features associated with the first-part image. Similarly, the term "second-part image information" is used herein to refer to either the pixels associated with a second-part image, or some kind of feature-space representation of the second-part image.

With the above terminology, the purpose of the trained generator component 104 is to map first-part image information to second-part generated image information. The first-part image information may correspond to either the raw pixels associated with a first-part image, or a feature-space representation of the first-part image. Similarly, the second-part generated image information may correspond to either the raw pixels associated with a second-part generated image, or a feature-space representation of the second-part generated image. The qualifier "generated" is used herein to indicate that that the image information produced by the generator component 104 reflects insight gained from a plurality of real preexisting images, but does not necessarily match any of those preexisting images. That is, a generated image is created, not retrieved from a preexisting empirical distribution of images.

The cGAN 106 includes a generator component 104' (G) which maps first-part image information y, together with an instance of random information z taken from a distribution $p_z$, into the second-part generated image information. For example, the generator component 104' can first concatenate a vector representing the random information z with a vector representing the first-part image information y, and then map this concatenated information into the second-part generated information. Note that the generator component 104' represents the training-phase counterpart of the fully trained generator component 104. That is, once the generator component 104' becomes fully trained, it constitutes the generator component 104. At any stage in training, the behavior of the generator component 104' is given by a set of weighting values $\theta_g$.

The cGAN also includes a discriminator component 124 (D) for generating a score which reflects a level of confidence that an instance of second-part image information fed to it is real, as opposed to generated. A real instance of second-part image information corresponds to an actual second-part image extracted from a composite image. A generated instance of second-part image information is produced by the generator component 104'. At any stage in training, the behavior of the discriminator component 124 is represented by a set of weighting values $\theta_d$.

A training component 126 feeds instances of image information to the generator component 104' and the discriminator component 124. The training component 126 also updates weighting values for the generator component 104' and the discriminator component 124 based on the currently-observed performance of these two components. In practice, the training component 126 can update the weighting values of the discriminator component 124 at rate r and the weighting values of the generator component 104' at rate s; in some implementations, r>s.

More specifically, the training component 126 updates the generator component 104' and the discriminator component 124 subject to the following objective function:

$$\min_G \max_D V(D, G) = \qquad (1)$$
$$E_{x \sim p_d(x)}[\log D(x \mid y)] + E_{z \sim p_z(x)}[\log(1 - D(G(z \mid y)))].$$

In this equation, y represents an instance of first-part image information (e.g., describing an extracted image of a pair of pants), and x represents an instance of second-part image information (e.g., describing an extracted image of a complementary shirt). $p_d$ represents the distribution of the discriminator component 124 over x. G(z|y) represents an instance of second-part generated information generated by the generator component 104', given an instance of random information z and an instance of first-part image information y. D(x|y) represents the probability that x represents a real instance of second-part image information, given y.

The training component 126 attempts to train the discriminator component 124 to maximize the first part of Equation (1), i.e., (log D(x|y)). By doing this, the training component 126 maximizes the probability that the discriminator component 124 will correctly identify real and generated instances of second-part information. At the same time, the training component 126 attempts to train the generator component 104' to minimize the second part of Equation (1), i.e., (log(1−D(G(z|y)))). By doing this, the training component 126 increases the ability of the generator component 104' to "fool" the discriminator component 124 into classifying a generated image as being real. Overall, the cGAN 106 is said to be adversarial because the generator component 104' and the discriminator component 124 are pitted against each other; as each component improves its performance, it makes the function of the other component more difficult to perform. The cGAN 106 is qualified as "conditional" because the generator component 104' generates second-part image information based on the first-part image information y, and not z alone.

Different implementations can formulate the above-described objective function in different environment-specific ways. In one implementation, the training component 126 can attempt to train the generator component 104' to solve:

$$\widehat{\theta_g} = \operatorname*{argmin}_{\theta_g} \frac{1}{N} \sum_{k=1}^{N} L_{cf}\left(G_{\theta_g}(y_k), x_k\right). \qquad (2)$$

N represents a number of pairs of first-part and second-part extracted images in the training corpus, each such pair represented by $(y_k, x_k)$. $L_{cf}(\bullet)$ represents a loss function of the generator component 104'. $G_{\theta_g}(y_k)$ represents an instance of second-part generated image information generated by the generator component 104', with respect to the first-part image information $y_k$.

In one implementation, the generator loss function $L_{cf}(\bullet)$ can be defined as a weighted combination of plural individual loss components that model respective desirable characteristics of the second-part generated image. For instance, in one case, the generator loss function is given by:

$$L_{cf} = \alpha_1 L_{MSE} + \alpha_2 L_{percept} + \alpha_3 L_{adv} \qquad (3).$$

$L_{MSE}$, $L_{percept}$, and $L_{adv}$ represent the individual loss components, while $\alpha_1$, $\alpha_2$, and $\alpha_3$ represent weighting factor values.

More specifically, $L_{MSE}$ expresses the mean square error loss between the first-part image information x and the second-part generated information. The training component 126 can compute this loss as follows:

$$L_{MSE} = \frac{1}{WH} \left\| G_{\theta_g}(y) - x \right\|_F^2. \qquad (4)$$

W and H correspond to the width and height of the first-part and second-part images, respectively. $\|\bullet\|_F$ corresponds to the Frobenius norm.

$L_{percept}$ expresses the perceptual loss between the first-part image information x and the second-part generated information. In one implementation, the training component 126 can compute this loss by taking the two-dimensional discrete cosine transform (DCT) of the first-part image information x and the second-part generated information, as follows:

$$L_{percept} = \frac{1}{WH} \left\| \Omega_{256}(G_{\theta_g}(y)) - \Omega_{256}(x) \right\|_F^2. \qquad (5)$$

W and H again represent the width and height of the image information. $\Omega_k$ expresses a two-dimension DCT matrix of size k×k, applied channel-wise to the image information.

Finally, $L_{adv}$ expresses the adversarial loss of the generator component 104'. The training component 126 may compute this loss as follows:

$$L_{adv} = \sum_{k=1}^{N} -\log D_{\theta_d}(G_{\theta_g}(y)). \qquad (6)$$

The inner term of this equation reflects the probability that the generator component 104' will produce a valid reconstruction of second-part image information, given y. The training component 126 sums this probability over all N training samples in the training corpus.

In one implementation, the discriminator component 124 performs its function by receiving actual second-part image information x. In another implementation, instead of receiving actual second-part information, the discriminator component 124 receives a transformation L(x) of the actual second-part image information x. In one implementation L(x) represents a transformation of a linear combination of x and a generated facsimile of x, as in:

$$L(x) = \beta x + (1 - \beta) G_{\theta_g}(y). \qquad (7)$$

The symbol β represents a random value between 0 and 1. The transformed image information L(x) is considered real if β is larger than a prescribed threshold value T. L(x) is considered generated (that is, "fake") if β≤T. The training component 126 increases T as training proceeds. This has the net effect of providing smoother training of the cGAN 106. In one implementation, the training system 102 can implement the transformation L(x) as a deep neural network, which is trained in tandem with the cGAN 106.

In one example, the training component 126 can feed pairs of images to the cGAN 106 in any arbitrary order. This corresponds to a randomized batch approach (RBA). In another example, the training component 126 can first form clusters of related pairs, and then feed pairs of images to the cGAN 106 on a cluster-by-cluster basis. This constitutes a clustered batch approach (CBA). For example, a cluster of related pairs may shows pants arranged in a particular pose, etc.

Figure 2:
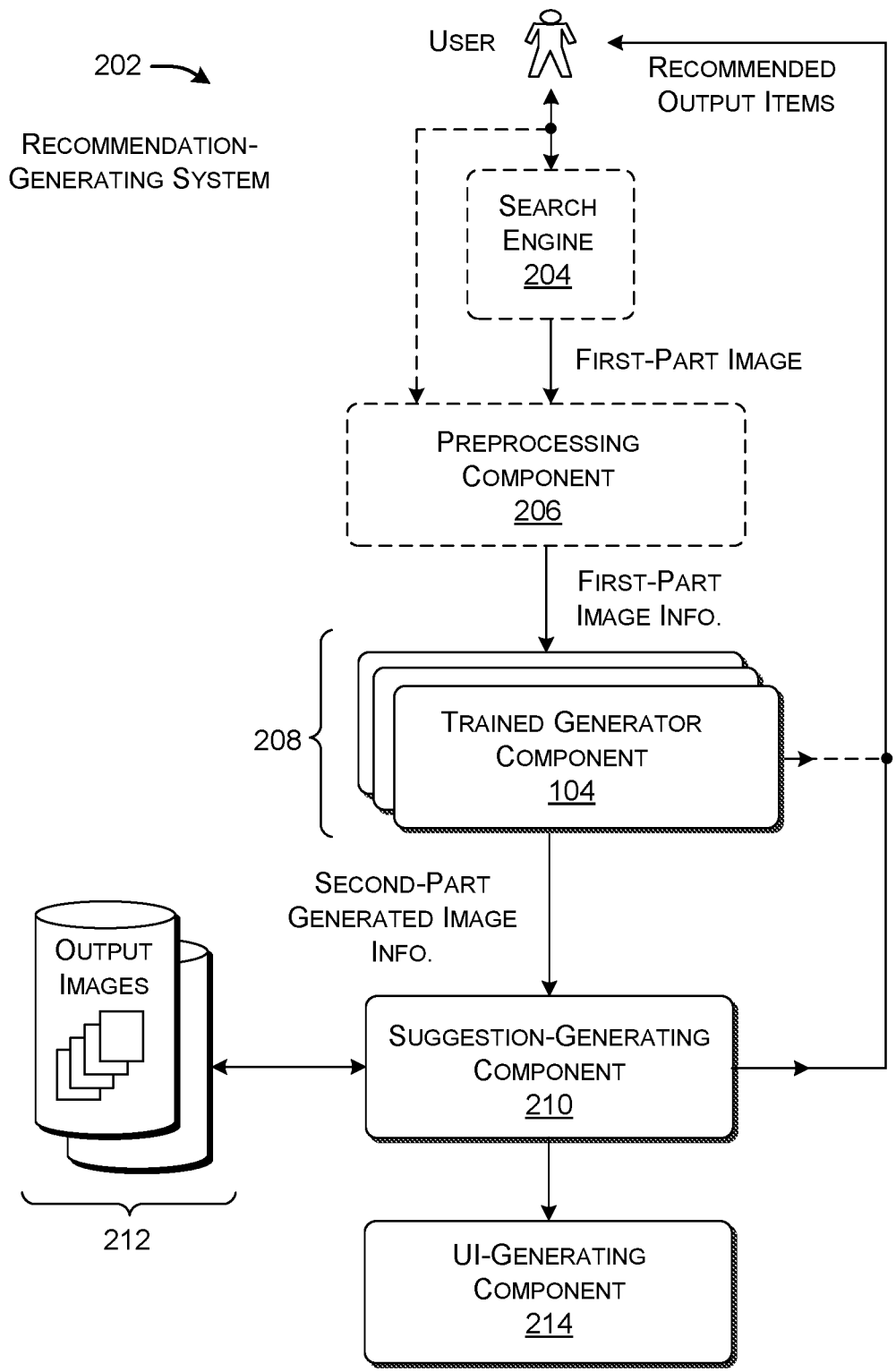
FIG. 2 shows a recommendation-generating system that recommends output images using the generator component, produced using the training system of FIG. 1.

Advancing now to FIG. 2, this figure shows a recommendation-generating system 202 that recommends images using the trained generator component 104, produced using the training system 102 of FIG. 1. As an initial step, a user can interact with a search engine 204 via a browser application to select a first-part image, such as a pair of pants. The user can perform this task in various ways, such as by searching for, finding, and clicking on the first-part image. Here, "clicking on" broadly refers to any mechanism for selecting an image, such as selecting it via a mouse device, a touch on a touch-sensitive surface, etc. Or the user can click on a page which contains the first-part image as part thereof, among other information, etc. In other cases, the user can click on a particular part of a retrieved image, such as by clicking on a lower garment shown in an image; this selected part constitutes the first-part image. In general, the user selects the first-part image by submitting one or more input signals into a browser application and/or some other application, by interacting with an input device (mouse device, touch-sensitive surface, keyboard, etc.). In some cases, an optional preprocessing component 206 transforms the selected first-part image into a feature-space representation of the first-part image, if that information does not already exist for the first-part image.

The trained generator component 104 then maps first-part image information y into an instance of second-part generated image information $G_{\theta_g}(y)$. In other cases, the trained generator component 104 can map the first-part image information y into plural instances of second-part generated image information. The trained generator component 104 can perform this task by inputting a different instance of noise information z for each iteration. In some cases, each instance of second-part generated image information represents a pixel-level representation of a second-part generated image. In other cases, each instance of second-part generated information represents a feature-space representation of a second-part generated image.

As shown, the recommendation-generating system 202 can alternatively provide plural trained generator components 208, each of which performs a different pairwise mapping transformation. The recommendation-generating system 202 can select an appropriate generator component based on knowledge of the type of content contained in the first-part image that the user has selected, together with knowledge of the kind of complementary image that should be presented to the user. The recommendation-generating system 202 can detect the content of the first-part image using various techniques, such as by analyzing metadata associated with the first-part image, and/or by using a machine-trained classification model to identify the content associated with the first-part image, etc. The recommendation-generating system 202 can determine the type of complementary image that should be presented to the user based on a preconfigured setting, e.g., as defined by an administrator or the user himself or herself. Or the recommendation-generating system 202 can allow a user to enter a real-time command which conveys the kind of complementary image that the user is interested in, e.g., by allowing the user to click on a "show me matching shirts" graphical command, etc.

A suggestion-generating component 210 retrieves one or more second-part output images based on the second-part generated image information generated by the trained generator component 104. The operation of the suggestion-generating component 210 will be described in greater detail below, with reference to FIG. 5. By way of overview, the suggestion-generating component 210 can select one or more second-part output images from a data store 212 that are determined to match the second-part generated image information.

Finally, a user interface (UI)-generating component 214 generates a user interface presentation that displays the second-part output images generated by the suggestion-generating component 210. In some cases, the UI-generating component 214 can also display the first-part image selected by the user; that will allow the user to visually judge the compatibility of the first-part image with each second-part output image.

Overall, the recommendation-generating system 202 provides relevant suggestions of second-part images, given the user's specification of an input first-part image. The recommendation-generating system 202 can provide good suggestions because it uses a generator component 104 that is trained, using the cGAN 106, based on an up-to-date corpus of composite images, each of which shows a first-part image and a second-part image. The recommendation-generating system 202 can also be said to make efficient use of computing resources because it quickly provides good suggestions to the user, reducing the need for the user to engage in a lengthy search session.

Figure 3:
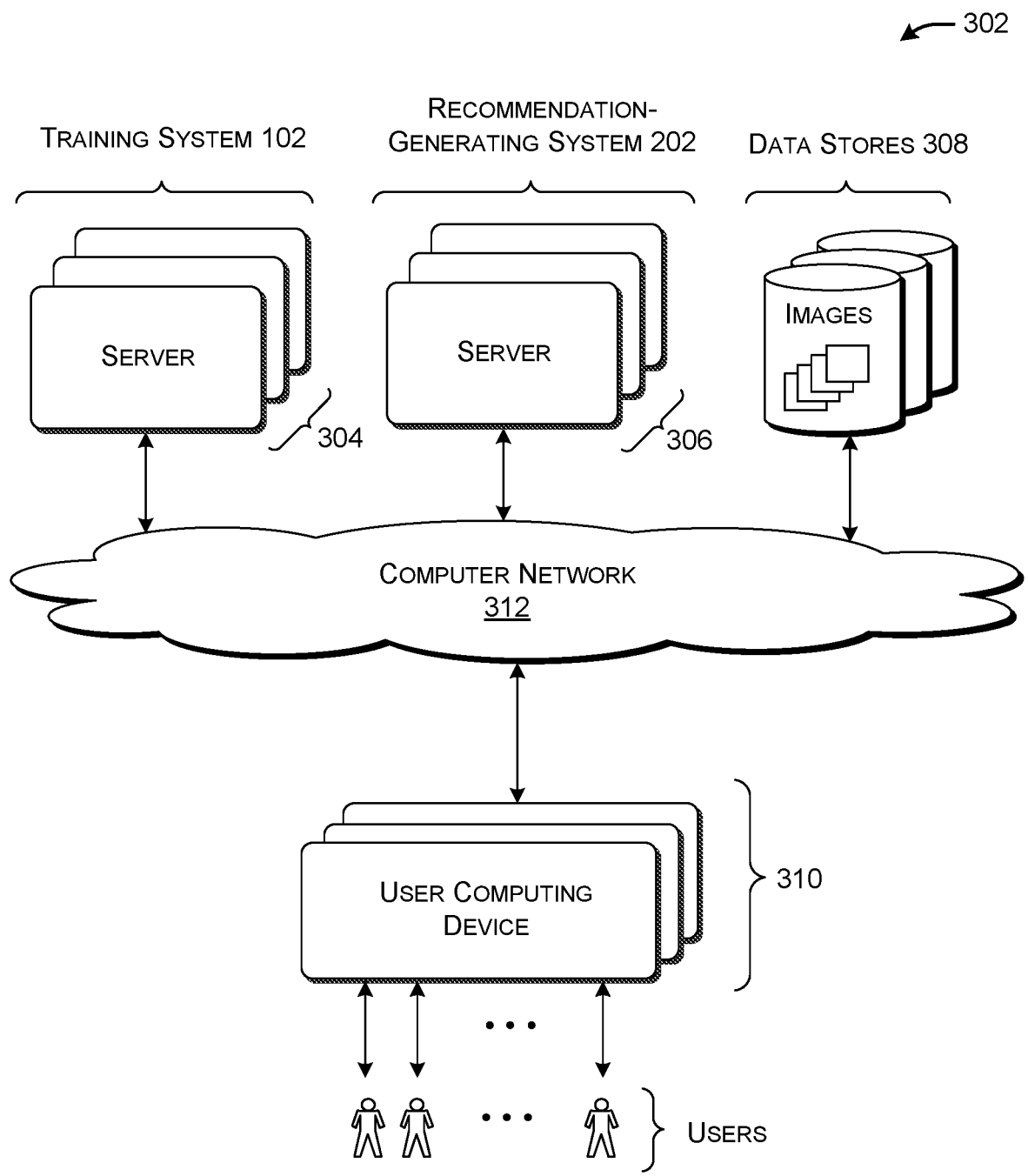
FIG. 3 shows computing equipment that can be used to implement the training system and the recommendation-generating system of FIGS. 1 and 2.

FIG. 3 shows computing equipment 302 that can be used to implement the training system 102 and the recommendation-generating system 202 of FIGS. 1 and 2. In one implementation, one or more computing devices, such as one or more servers 304, implement the training system 102. One or more computing devices, such as one or more servers 306, implement the recommendation-generating system 202. A plurality of data stores 308 store images for processing by the training system 102 and the recommendation-generating system 202.

End-users may interact with the recommendation-generating system 202 via a plurality of user computing devices 310, via a computer network 312. The user computing devices 310 can correspond to any combination of: desktop personal computing devices, laptop devices, handheld devices (such as tablet-type devices, smartphones, etc.), game console devices, mixed-reality devices, wearable computing devices, and so on. The computer network 312 may correspond to a wide area network (such as the Internet), a local area network, one or more point-to-point links, or any combination thereof.

FIG. 3 indicates that all of the functionality of the recommendation-generating system 202 is allocated to the server(s) 306. A user computing device may interact with this functionality via a browser program running on the user computing device. Alternatively, any part of the functionality of the recommendation-generating system 202 can be implemented by a local user computing device.

FIG. 4 shows illustrative aspects of the training set generating component (TSGC) 114, which is part of the training system 102 introduced in FIG. 1. As the name indicates, the purpose of the TSGC 114 is to generate the corpus of training images. The TSGC 114 will be described below in the context of the extraction of images of garment bottoms (e.g., pants) and garment tops (e.g., shirts, jackets, blouses, etc.). But the principles described below can be extended to the extraction of any pairing of complementary images.

A first segmentation component 402 receives matching images from the matching component 110. An illustrative matching image 404 includes a composite image 406 that shows a complete human body, optionally together with other content (such as background content, in this case, a building). The first segmentation component 402 extracts the composite image 406 from the remainder of the matching image 404. The first segmentation component 402 can perform this task using any computer-automated segmentation technique. Alternatively, or in addition, the first segmentation component 402 can perform this task with the manual assistance of human reviewers 408, via a crowdsourcing platform.

A second segmentation component 410 receives the composite image 406 from the first segmentation component 402. The second segmentation component 410 then extracts a first-part extracted image 412 and a second-part extracted image 414 from the composite image 406. Here, the first-part extracted image 412 shows the pants worn by the human subject, while the second-part extracted image 414 shows the jacket and shirt worn by the human subject. Again, the second segmentation component 410 can perform this task using any computer-automated segmentation technique. Alternatively, or in addition, the second segmentation component 410 can perform this task with the manual assistance of human reviewers 416, via a crowdsourcing platform.

In one implementation, an automated segmentation technique can first classify the pixels of an image using a machine-trained component, such as a Convolutional Neural Network (CNN) component. The classification of each pixel indicates the type of content to which it most likely pertains. For example, the first segmentation component 402 can use a machine-trained component which distinguishes between pixels showing human subjects and pixels showing non-human content. The second segmentation component 410 can use a machine-trained component to distinguish between lower-garment vs. upper-garment pixels, etc. The automated segmentation technique can then draw a region-of-interest (ROI) around each group of pixels that share the same classification. The automated segmentation technique can rely on different techniques to perform this function. In one approach, the automated segmentation technique draws a rectangle that encompasses all of the pixels that have the same classification, optionally ignoring outlying pixels that do not have neighboring pixels with the same classification. In another approach, the automated segmentation component iteratively merges image regions in an image that share the same classification. In another approach, the automated segmentation technique can use a Region Proposal Network (RPN) to generate the ROIs. Background information regarding the topic of the Region Proposal Network technique, in a general context, is described in Ren, et al., "Faster R-CNN: Towards Real-Time Object Detection with Region Proposal Networks," in arXiv:1506.01497v3 [cs.CV], Jan. 6, 2016, 9 pages.

A post-processing component 418 performs post-processing operations on the extracted images (412, 414). For example, the post-processing component 418 can center the principal content of each image, normalize each image, adjust the contrast of each image, etc. The post-processing component 418 can also reject any image that fails to meet one or more environment-specific tests. For example, the post-processing component 418 can reject an image if its resolution is below a prescribed threshold, or if its principal content is occluded by one or more objects, etc.

In some implementations, the post-processing component 418 can also convert each image to a feature-space representation. As noted above, the post-processing component 418 can perform this task using a machine-trained component, such as a CNN component. Background information regarding the topic of CNN components that convert images into feature-space representations, in a general context, include: Howard, et al., "MobileNets: Efficient Convolutional Neural Networks for Mobile Vision," in arXiv: 1704.04861v1 [cs.CV], Apr. 17, 2017, 9 pages; He, et al., Deep Residual Learning for Image Recognition," in arXiv: 1512.03385v1 [cs.CV], Dec. 10, 2015, 12 pages; and Szegedy, et al., "Going Deeper with Convolutions," in arXiv:1409.4842v1 [cs.CV], Sep. 17, 2014, 12 pages.

In some implementations, the post-processing component 418 can also compress the original image itself or its feature-space representation. For example, the post-processing component can apply Principal Component Analysis (PCA) to reduce the size of each feature-space representation of an image. The above-described processing operations are described in the spirit of illustration, not limitation; other implementations can apply other types of post-processing operations.

Figure 5:
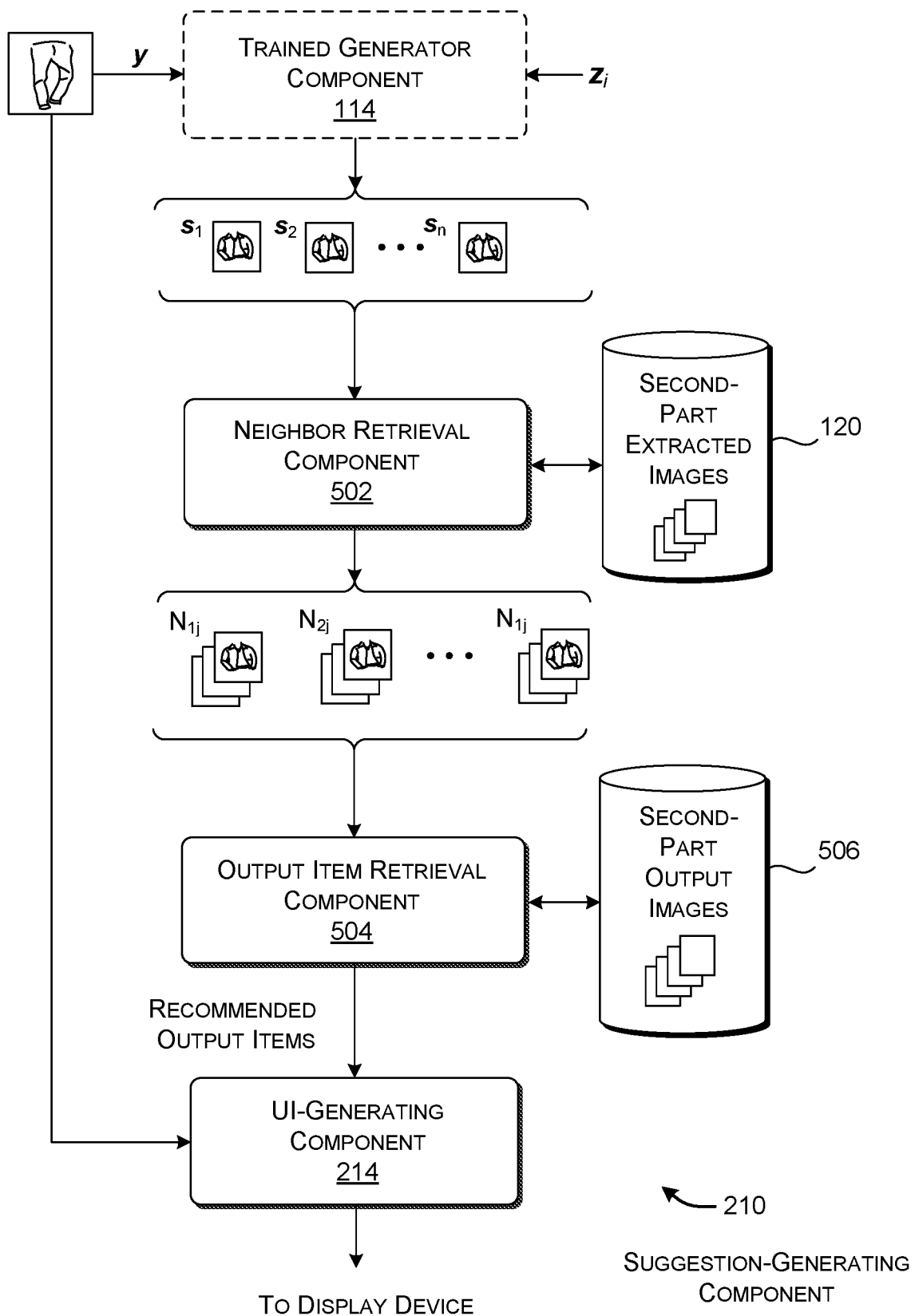
FIG. 5 shows illustrative aspects of the recommendation-generating system of FIG. 2.

FIG. 5 shows illustrative aspects of the recommendation-generating system 202 of FIG. 2. Assume that the recommendation-generating system 202 receives a plurality of instances of second-part generated image information ($s_1$, $s_2$, . . . , $s_n$) from the trained generator component 104. For example, the trained generator component 104 can generate plural such instances by successively inputting different instances of random information z, for a specified instance of first-part image information y, e.g., which shows a pair of pant. Each such instance of generated image information can be formally expressed as $G_{\theta_g}(y)$. Assume that each instance of second-part generated image information corresponds to an image of a garment top having a prescribed style.

In one implementation, the recommendation-generating component 202 can display the instances of second-part generated image information ($s_1$, $s_2$, . . . , $s_n$) to the user. Note, however, that each instance of second-part generated information does not necessarily have a real counterpart image, and therefore does not necessarily correspond to a real product that a user may purchase. Nevertheless, the user may find the second-part generated information helpful because it provides general suggestions as to products that may complement the input first-part image information y.

In another implementation, the recommendation-generating component 202 identifies one or more preexisting images which resemble any of the instances of second-part generated image information ($s_1$, $s_2$, . . . , $s_n$). It then presents these preexisting images to the user in lieu of the generated image information, or in addition to the generated image information. In some implementations, each preexisting image is associated with a product that a user may purchase or otherwise select.

For example, in one implementation, a neighbor retrieval component 502 first identifies a neighboring set $N_{ij}$ of second-part extracted images in the data store 120 which match each instance of generated image information $s_i$. Recall that the training system 102 produces these second-part extracted images based on a set of culled composite images. The neighbor retrieval component 502 can perform its function by finding those second-part extracted images that are within a prescribed threshold distance of any instance of generated image information $s_i$. The neighbor retrieval component 502 can use any metric of distance to perform this task, such as cosine similarity, Euclidian distance, etc.

An output item retrieval component 504 can then map each second-part extracted image to one or more second-part output images, provided in a data store 506. For instance, each second-part output image may show a product page or advertisement associated with a product that can be actually purchased or otherwise selected by the user. The output item retrieval component 504 can match each second-part extracted image with one or more second-part output images in the same way as the neighbor retrieval component 502, e.g., by finding a set of output images within a prescribed threshold distance of a second-part extracted image, using any distance metric (e.g., cosine similarity, Euclidean distance, etc.). The output item retrieval component 504 can rank the identified second-part output images by their distance scores (e.g., their cosine similarity scores), and then select a set of k top-ranking output images. Finally, the UI-generating component 214 shows the selected first-part image together with the top-ranking second-part output images In other implementations, the recommendation-generating component 202 can omit the neighbor retrieval component 502. In that case, the output item retrieval component 504 directly compares each instance of generated image information $s_i$ with each of the candidate second-part output images.

Figure 6:
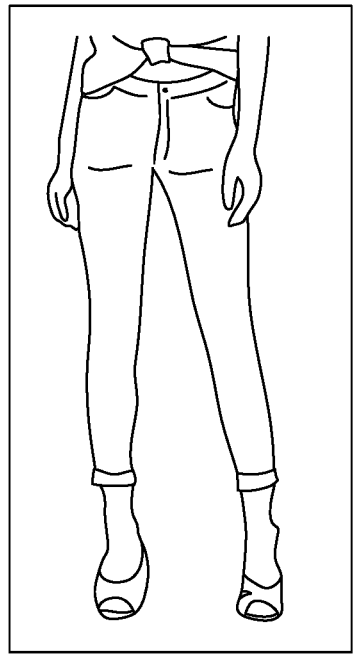
FIG. 6 shows an illustrative user interface presentation produced by the recommendation-generating system of FIG. 2.

FIG. 6 shows an illustrative user interface presentation 602 produced by the recommendation-generating system 202 of FIG. 2. In this non-limiting case, the presentation 602 shows a first-part image 604 and four second-part output images 606. The user interface presentation 602 can optionally show graphical prompts (608, 610, 612, 614) that allow the user to select any one of the second-part output images 606. For example, the user can click on the graphical prompt 608 to view a product page or advertisement associated with the second-part image 616. Alternatively, or in addition, the recommendation-generating component 202 can show the original instances of generated image information $s_i$ for the user's review, which may not correspond to actual products that a user may purchase.

In other cases, the recommendation-generating component 202 can provide plural sets of recommendations for the user's consideration within one or more user interface presentations. For example, assume that the user again begins by choosing the first-part image 604. The recommendation-generating component 202 can use a first trained generator component to find and display a set of complementary top garments (as shown in FIG. 6). It can also use a second trained generator component to find and display a set of complementary shoes (as not shown in FIG. 6). Each set of output images complements the pair of pants initially selected by the user.

In other cases, the recommendation-generating component 202 can treat one or more second-part output images as input examples, and find one or more sets of output images which complement these input examples. For example, the recommendation-generating system 202 can treat the shirt shown in the second-part image 616 as a new input example. It can then find and display one or more necklaces which complement the shirt, etc. The recommendation-generating system 202 can extend this chain of recommendations any number of steps.

The user interface presentation 602 can also include real-time configuration options 618 that allow a user to control the set(s) of recommendations that are displayed, if any. Alternatively, or in addition, the user interface presentation 602 includes a link 620 to a separate configuration page (not shown) which allows the user to more generally specify the recommendation behavior of the UI-generating component 214. Although not shown, the UI-generating component 214 can include a learning component which learns the recommendation-setting preferences of a user, and automatically invokes those settings for that user.

Figure 7:
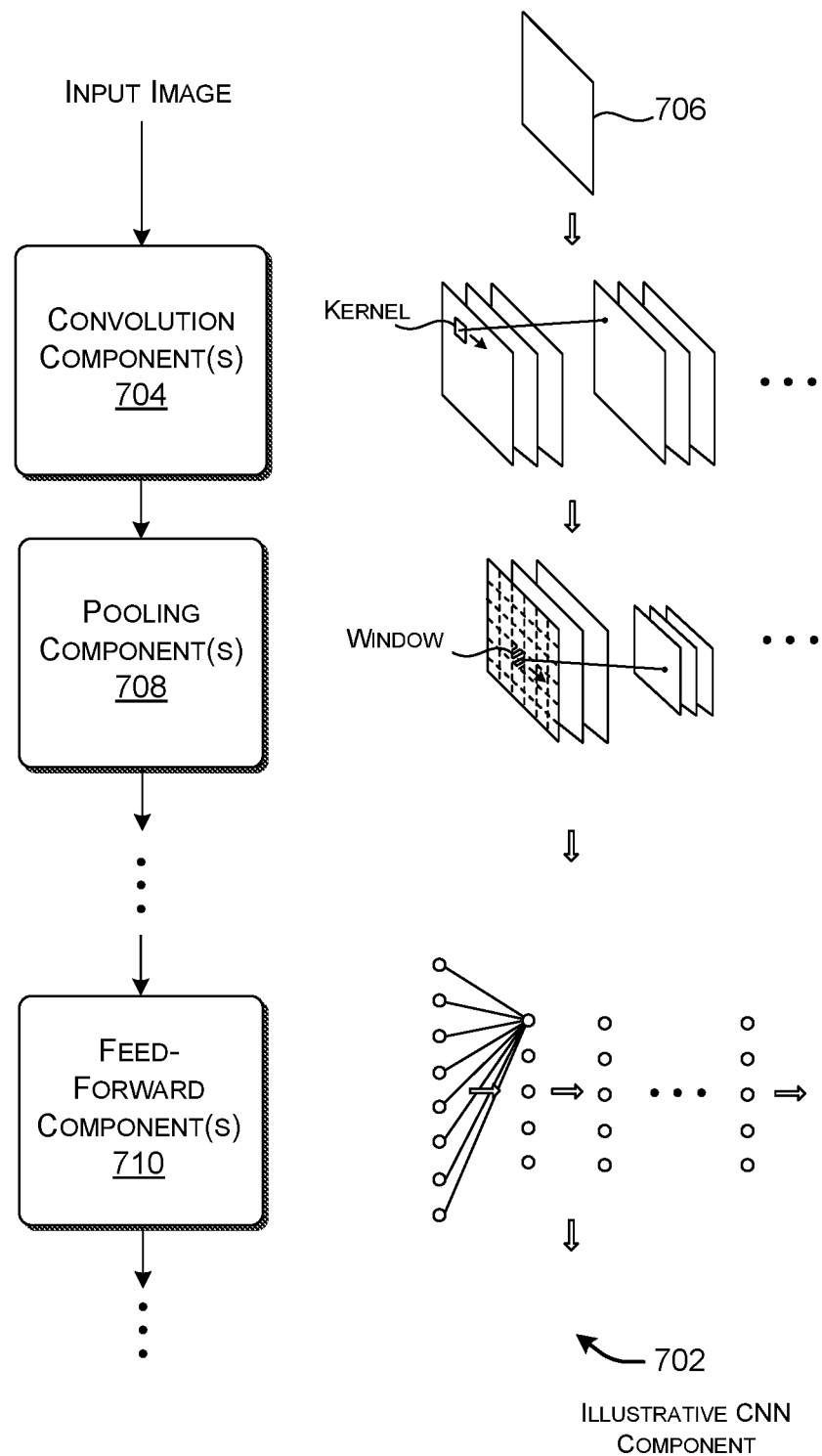
FIG. 7 shows an illustrative Convolutional Neural Network (CNN) component that can be used to implement aspects of the training system and recommendation-generating system of FIGS. 1 and 2.

FIG. 7 shows an illustrative Convolutional Neural Network (CNN) component 702 that can be used to implement aspects of the training system 102 and recommendation-generating system 202 of FIGS. 1 and 2. For example, the generator component (104, 104') and the discriminator component 124 can each be implemented using a CNN component 702. FIG. 7 describes general characteristics of CNN functionality.

The CNN component 702 performs analysis in a pipeline of stages. One of more convolution components 704 perform a convolution operation on an input image 706. One or more pooling component 708 perform a down-sampling operation. One or more feed-forward components 710 respectively provide one or more fully-connected neural networks, each including any number of layers. More specifically, the CNN component 702 can intersperse the above three kinds of components in any order. For example, the CNN component 702 can include two or more convolution components interleaved with pooling components. In some implementations, any kind of post-processing component can operate on the output of the preceding layers. For example, a Softmax component can operate on the image information provided by a preceding layer using a normalized exponential function, to generate final output information.

In each convolution operation, a convolution component moves an n×m kernel across an input image (where "input image" in this general context refers to whatever image is fed to the convolutional component). In one case, at each position of the kernel, the convolution component generates the dot product of the kernel values with the underlying pixel values of the image. The convolution component stores that dot product as an output value in an output image at a position corresponding to the current location of the kernel.

More specifically, the convolution component can perform the above-described operation for a set of different kernels having different machine-learned kernel values. Each kernel corresponds to a different pattern. In early layers of processing, a convolutional component may apply a kernel that serves to identify relatively primitive patterns (such as edges, corners, etc.) in the image. In later layers, a convolutional component may apply a kernel that finds more complex shapes (such as shapes that resemble human legs, arms, etc.).

In each pooling operation, a pooling component moves a window of predetermined size across an input image (where the input image corresponds to whatever image is fed to the pooling component). The pooling component then performs some aggregating/summarizing operation with respect to the values of the input image enclosed by the window, such as by identifying and storing the maximum value in the window, generating and storing the average of the values in the window, etc.

A feed-forward component can begin its operation by forming a single input vector. It can perform this task by concatenating the rows or columns of the input image (or images) that are fed to it, to form a single input vector $z_1$. The feed-forward component then processes the input vector $z_1$ using a feed-forward neural network. Generally, a feed-forward neural network can include N layers of neurons that map the input vector $z_1$ into an output vector q. The values in any layer j may be given by the formula, $z_j = f(W_j z_{j-1} + b_j)$, for j=2, ... N. The symbol $W_j$ denotes a j-th machine-learned weight matrix, and the symbol $b_j$ refers to an optional j-th machine-learned bias vector. The function $f(\bullet)$, referred to as the activation function, can be formulated in different ways, such as the tan h function, an ReLU function, etc.

The training component 126 iteratively produces weighting values that govern the operation of at least the convolution component(s) 704 and the feed-forward component(s) 710, and optionally the pooling component(s) 708. These values collectively constitute a machine-trained model. The training component 126 can perform its learning by iteratively operating on a set of images in a data store 120. The training component 126 can use any technique to generate the machine-trained model, such as the gradient descent technique.

Other implementations of the functionality described herein employ other machine-trained models (besides CNN models, or in addition to CNN models), including, but not limited to: Recurrent Neural Network (RNN) models, Support Vector Machine (SVC) models, classification tree models, Bayesian models, linear regression models, etc. An RNN model can use Long Short-Term Memory (LSTM) units, Gated Recurrent Units (GRUs), etc.

B. Illustrative Processes

Figure 8:
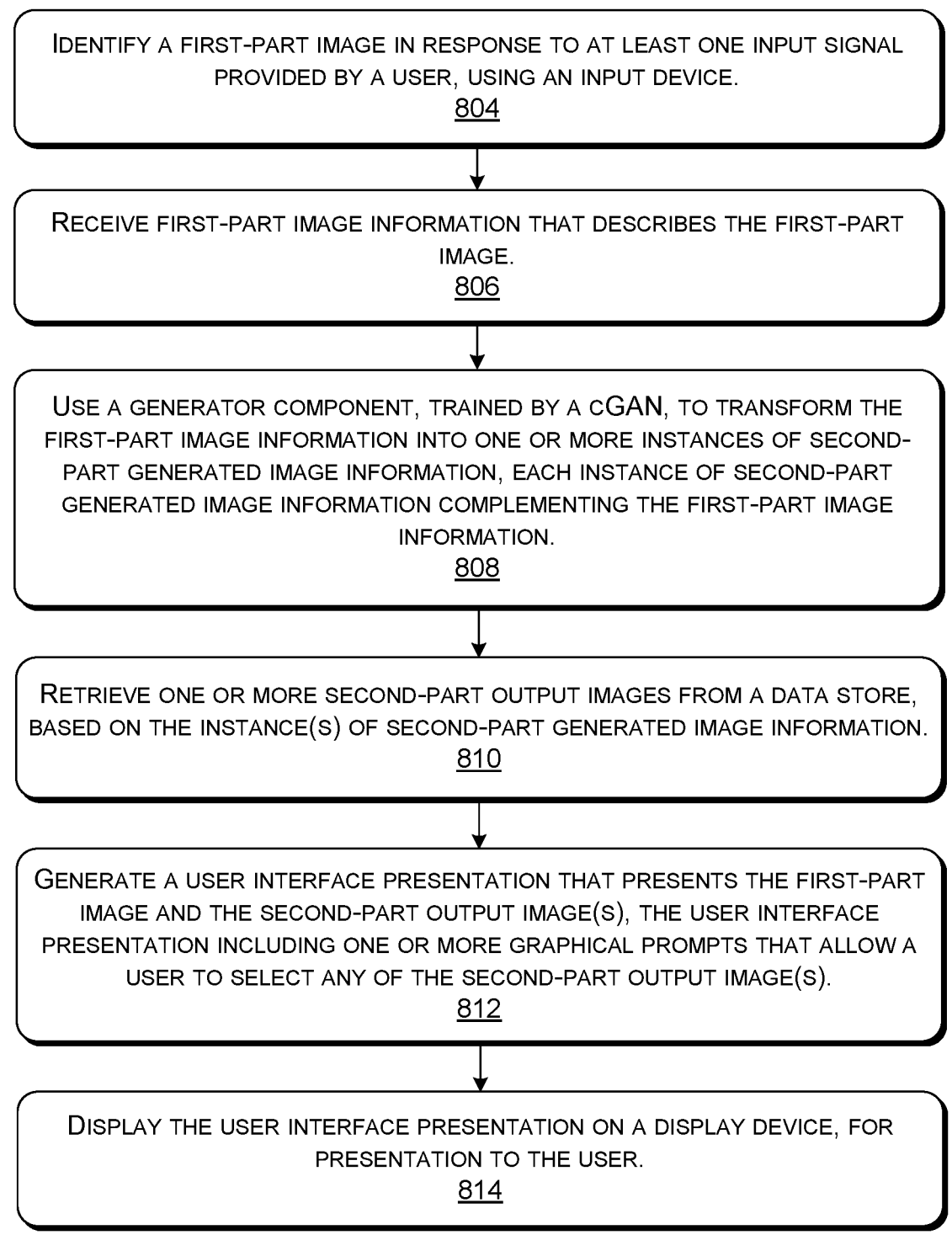
FIG. 8 is a flowchart that shows one illustrative manner of operation of recommendation-generating system of FIG. 2.

FIGS. 8 and 9 show processes (802, 902) that explain the operation of the computing systems of Section A in flowchart form. Since the principles underlying the operation of the computing systems have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

FIG. 8 shows a process 802 that represents an overview of one manner of operation of the recommendation-generating system 202 of FIG. 2. In block 804, the recommendation-generating system 202 identifies a first-part image in response to at least one input signal provided by a user, using an input device. In block 806, the recommendation-generating system 202 receives first-part image information that describes the first-part image. In block 808, the recommendation-generating system uses a generator component 104 to transform the first-part image information into one or more instances of second-part generated image information, each instance of second-part generated image information complementing the first-part image information. In block 810, the recommendation-generating system 202 retrieves one or more second-part output images 606 from a data store 506, based on the instance(s) of second-part generated image information. In block 812, the recommendation-generating system 202 generates a user interface presentation 602 that presents the first-part image and the second-part output image(s) 606. The user interface presentation 602 includes one or more graphical prompts (608, 610, 612, 614) that allow a user to select any of the second-part output images. In block 814, the recommendation-generating system 202 displays the user interface presentation 602 on a display device, for presentation to the user. The generator component 104 is trained by a computer-implemented training system 102 using a conditional generative adversarial network (cGAN) 106.

FIG. 9 shows a process 902 that represents one illustrative manner of operation of the training system 102 of FIG. 1. In block 904, the training system 102 identifies, using a matching component 110, a set of composite images, each composite image being composed of at least a first-part image and a second-part image. In block 906, the training system 102 segments the composite images to generate a plurality of first-part extracted images and a plurality of second-part extracted images. In block 908, the training system 102 uses a conditional generative adversarial network (cGAN) 106 to train a generator component 104' based on the plurality of first-part extracted images and the plurality of second-part extracted images. The operation of using the cGAN 106 includes, for a plurality of instances of first-part image information: in block 910, using the generator component 104' to map an instance of first-part image information, together with an instance of random information taken from a distribution, into an instance of second-part generated image information; in block 912, using a discriminator component 124 to provide a score which reflects a level of confidence that the instance of second-part generated image information is representative of a real preexisting second-part image; and, in block 914, based at least on the score, adjusting weight values of the generator component 104' and the discriminator component 124.

C. Representative Computing Functionality

Figure 10:
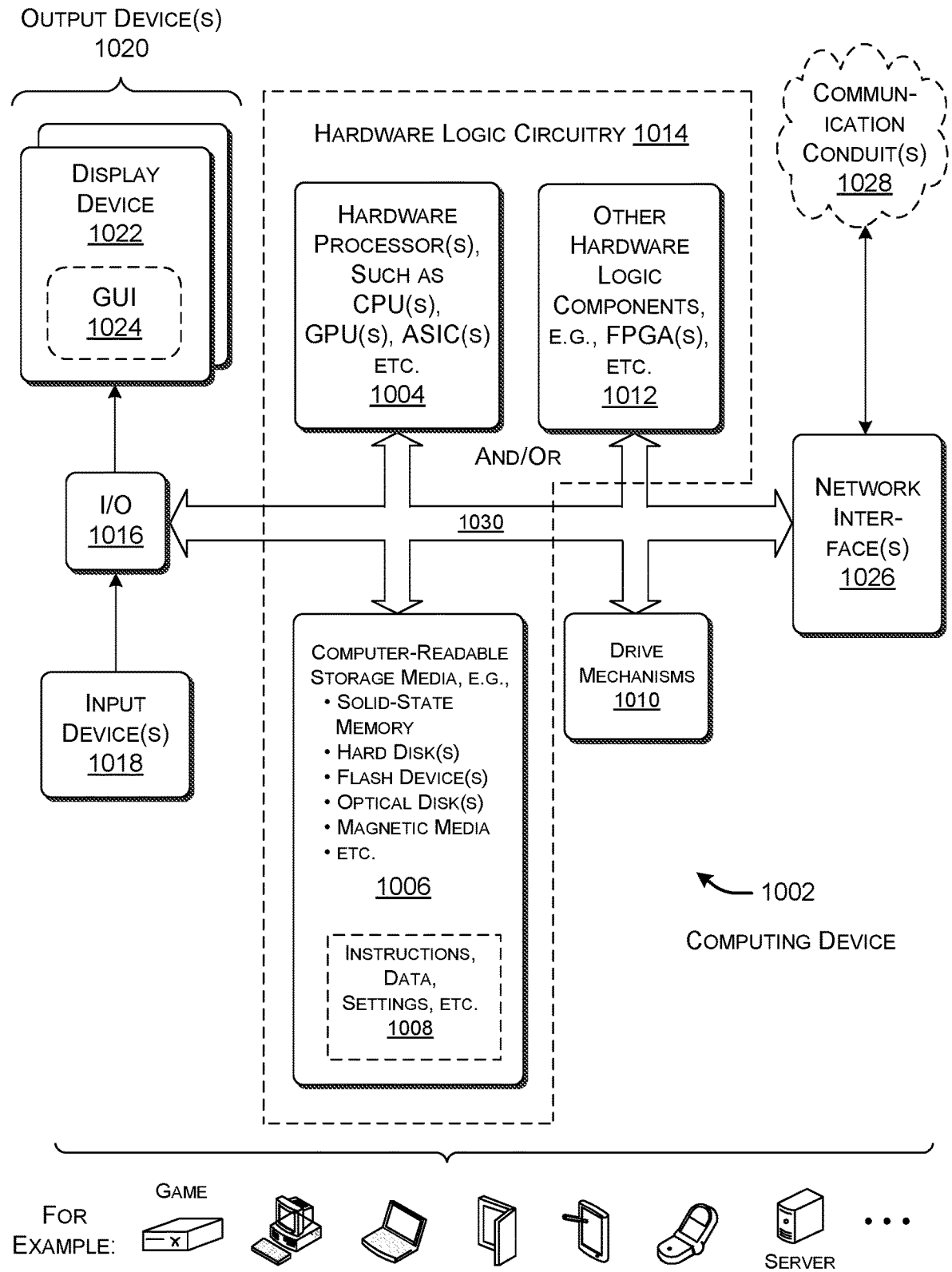
FIG. 10 shows an illustrative type of computing device that can be used to implement any aspect of the features shown in the foregoing drawings.

FIG. 10 shows a computing device 1002 that can be used to implement any aspect of the mechanisms set forth in the above-described figures. For instance, with reference to FIG. 3, the type of computing device 1002 shown in FIG. 10 can be used to implement any computing device associated with the training system 102 or the recommendation-generating system 202, or any of the user devices 310, etc. In all cases, the computing device 1002 represents a physical and tangible processing mechanism.

The computing device 1002 can include one or more hardware processors 1004. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1002 can also include computer-readable storage media 1006, corresponding to one or more computer-readable media hardware units. The computer-readable storage media 1006 retains any kind of information 1008, such as machine-readable instructions, settings, data, etc. Without limitation, for instance, the computer-readable storage media 1006 may include one or more solid-state devices, one or more magnetic hard disks, one or more optical disks, magnetic tape, and so on. Any instance of the computer-readable storage media 1006 can use any technology for storing and retrieving information. Further, any instance of the computer-readable storage media 1006 may represent a fixed or removable component of the computing device 1002. Further, any instance of the computer-readable storage media 1006 may provide volatile or non-volatile retention of information.

The computing device 1002 can utilize any instance of the computer-readable storage media 1006 in different ways. For example, any instance of the computer-readable storage media 1006 may represent a hardware memory unit (such as Random Access Memory (RAM)) for storing transient information during execution of a program by the computing device 1002, and/or a hardware storage unit (such as a hard disk) for retaining/archiving information on a more permanent basis. In the latter case, the computing device 1002 also includes one or more drive mechanisms 1010 (such as a hard drive mechanism) for storing and retrieving information from an instance of the computer-readable storage media 1006.

The computing device 1002 may perform any of the functions described above when the hardware processor(s) 1004 carry out computer-readable instructions stored in any instance of the computer-readable storage media 1006. For instance, the computing device 1002 may carry out computer-readable instructions to perform each block of the processes described in Section B.

Alternatively, or in addition, the computing device 1002 may rely on one or more other hardware logic components 1012 to perform operations using a task-specific collection of logic gates. For instance, the hardware logic component(s) 1012 may include a fixed configuration of hardware logic gates, e.g., that are created and set at the time of manufacture, and thereafter unalterable. Alternatively, or in addition, the other hardware logic component(s) 1012 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 10 generally indicates that hardware logic circuitry 1014 includes any combination of the hardware processor(s) 1004, the computer-readable storage media 1006, and/or the other hardware logic component(s) 1012. That is, the computing device 1002 can employ any combination of the hardware processor(s) 1004 that execute machine-readable instructions provided in the computer-readable storage media 1006, and/or one or more other hardware logic component(s) 1012 that perform operations using a fixed and/or programmable collection of hardware logic gates. More generally stated, the hardware logic circuitry 1014 corresponds to one or more hardware logic components of any type(s) that perform operations based on logic stored in and/or otherwise embodied in the hardware logic component(s).

In some cases (e.g., in the case in which the computing device 1002 represents a user computing device), the computing device 1002 also includes an input/output interface 1016 for receiving various inputs (via input devices 1018), and for providing various outputs (via output devices 1020). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1022 and an associated graphical user interface presentation (GUI) 1024. The display device 1022 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1002 can also include one or more network interfaces 1026 for exchanging data with other devices via one or more communication conduits 1028. One or more communication buses 1030 communicatively couple the above-described components together.

The communication conduit(s) 1028 can be implemented in any manner, e.g., by a local area computer network, a wide area computer network (e.g., the Internet), point-to-point connections, etc., or any combination thereof. The communication conduit(s) 1028 can include any combination of hardwired links, wireless links, routers, gateway functionality, name servers, etc., governed by any protocol or combination of protocols.

FIG. 10 shows the computing device 1002 as being composed of a discrete collection of separate units. In some cases, the collection of units may correspond to discrete hardware units provided in a computing device chassis having any form factor. FIG. 10 shows illustrative form factors in its bottom portion. In other cases, the computing device 1002 can include a hardware logic component that integrates the functions of two or more of the units shown in FIG. 1. For instance, the computing device 1002 can include a system on a chip (SoC or SOC), corresponding to an integrated circuit that combines the functions of two or more of the units shown in FIG. 10.

The following summary provides a non-exhaustive set of illustrative aspects of the technology set forth herein.

According to a first aspect, one or more computing devices for retrieving one or more output images are described. The computing device(s) include hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates. The operations include: identifying a first-part image in response to at least one input signal provided by a user, using an input device; receiving first-part image information that describes the first-part image; using a generator component to transform the first-part image information into one or more instances of second-part generated image information, each instance of second-part generated image information complementing the first-part image information, the generator component having been trained by a computer-implemented training system using a conditional generative adversarial network (cGAN); retrieving one or more second-part output images from a data store based on the instance(s) of second-part generated image information; generating a user interface presentation that presents the first-part image and the second-part output image(s), the user interface presentation including one or more graphical prompts that allow a user to select any of the second-part output image(s); and displaying the user interface presentation on a display device, for presentation to the user.

According to a second aspect, the first-part image shows a first apparel item selected by the user, and each second-part output image shows a second apparel item that complements the first apparel item.

According to a third aspect, each instance of second-part generated image information describes features associated with a generated second-part image.

According to a fourth aspect, each instance of second-part generated image information describes pixels associated with a generated second-part image.

According to a fifth aspect, the operations further include selecting the generator component from among a set of generator components, each generator component being associated with a pair of complementary item types.

According to a sixth aspect, the operations further include applying two or more generator components, each generator component being associated with a pair of complementary item types.

According to a seventh aspect, the retrieving operation includes: identifying one or more second-part extracted images that match any of the instance(s) of second-part generated image information, each second-part extracted image originating from a composite image that contains, as part thereof, at least a first-part image and a second-part image; and identifying the second-part output image(s) that match any of the second-part extracted image(s), each second-part output image showing an image of a selectable product.

According to an eighth aspect, the training system produces the generator component by: identifying a set of composite images, each composite image being composed of at least a first-part image and a second-part image; segmenting the composite images to generate a plurality of first-part extracted images and a plurality of second-part extracted images; and using the cGAN to train the generator component based on the plurality of first-part extracted images and the plurality of second-part extracted images.

According to a ninth aspect, dependent on the eighth aspect, the operation of using the cGAN includes, for a plurality of instances of first-part image information: using the generator component to map an instance of first-part image information, together with an instance of random information taken from a distribution, into an instance of second-part generated image information; using a discriminator component to provide a score which reflects a level of confidence that the instance of second-part generated image information is representative of a real preexisting second-part image; and based at least on the score, adjusting weight values of the generator component and the discriminator component.

According to a tenth aspect, a method is described for retrieving one or more output images, implemented by one or more computing devices. The method includes: identifying a first-part image in response to at least one input signal provided by a user, using an input device; receiving first-part image information that describes the first-part image; using a generator component to transform the first-part image information into one or more instances of second-part generated image information, each instance of second-part generated image information complementing the first-part image information; retrieving one or more second-part output images from a data store, based on the instance(s) of second-part generated image information; generating a user interface presentation that presents the first-part image and the second-part output image(s), the user interface presentation including one or more graphical prompts that allow a user to select any of the second-part output image(s); and displaying the user interface presentation on a display device, for presentation to the user. The generator component is trained by a computer-implemented training system using a conditional generative adversarial network (cGAN) by: identifying a set of composite images, each composite image being composed of at least a first-part image and a second-part image; segmenting the composite images to generate a plurality of first-part extracted images and a plurality of second-part extracted images; and using the cGAN to train the generator component based on the plurality of first-part extracted images and the plurality of second-part extracted images.

According to an eleventh aspect, dependent on the tenth aspect, the first-part image shows a first apparel item selected by a user, and each second-part output image shows a second apparel item that complements the first apparel item.

According to a twelfth aspect, dependent on the eleventh aspect, the first apparel item is an upper-body apparel item, and the second apparel item is a lower-body apparel item.

According to a thirteenth aspect, dependent on the tenth aspect, the first-part image shows a first selectable product item selected by a user, and each second-part output image shows a second selectable product item that complements the first selectable product item.

According to a fourteenth aspect, dependent on the tenth aspect, each instance of second-part generated image information describes features associated with a generated second-part image.

According to a fifteenth aspect, dependent on the tenth aspect, each instance of the second-part generated image information describes pixels associated with a generated second-part image.

According to a sixteenth aspect, dependent on the tenth aspect, the method further includes selecting the generator component from among a set of generator components, each generator component being associated with a pair of complementary item types.

According to a seventeenth aspect, dependent on the tenth aspect, the operations further includes applying two or more generator components, each generator component being associated with a pair of complementary item types.

According to an eighteenth aspect, dependent on the tenth aspect, the retrieving operation further includes: identifying one or more second-part extracted images that match any of the instance(s) of second-part generated image information; and identifying the second-part output image(s) that match any of the second-part extracted image(s), each second-part output image showing an image of a selectable product.

According to a nineteenth aspect, dependent on the tenth aspect, the operation of using the cGAN includes, for a plurality of instances of first-part image information: using the generator component to map an instance of first-part image information, together with an instance of random information taken from a distribution, into an instance of second-part generated image information; using a discriminator component to provide a score which reflects a level of confidence that the instance of second-part generated image information is representative of a real preexisting second-part image; and based at least on the score, adjusting weight values of the generator component and the discriminator component.

According to a twentieth aspect, a computer-readable storage medium is described for storing computer-readable instructions. The computer-readable instructions, when executed by one or more hardware processors, perform a method that includes: identifying, using a matching component, a set of composite images, each composite image being composed of at least a first-part image and a second-part image; segmenting the composite images to generate a plurality of first-part extracted images and a plurality of second-part extracted images; and using a conditional generative adversarial network (cGAN) to train a generator component based on the plurality of first-part extracted images and the plurality of second-part extracted images. The operation of using the cGAN includes, for a plurality of instances of first-part image information: using the generator component to map an instance of first-part image information, together with an instance of random information taken from a distribution, into an instance of second-part generated image information; using a discriminator component to provide a score which reflects a level of confidence that the instance of second-part generated image information is representative of a real preexisting second-part image; and based at least on the score, adjusting weight values of the generator component and the discriminator component.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for retrieving one or more output images, comprising:
   hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
   identifying a first-part image in response to at least one input signal provided by a user, using an input device;
   receiving first-part image information that describes the first-part image;
   using a generator component implemented by the hardware logic circuitry to transform, using a neural network, the first-part image information into one or more instances of second-part generated image information, each instance of second-part generated image information complementing the first-part image information and being fake image information created by the generator component rather than being retrieved from a preexisting empirical distribution of images, the generator component having been trained by a computer-implemented training system using a conditional generative adversarial network (cGAN);

retrieving one or more second-part output images from a data store based on said one more instances of second-part generated image information;

generating a user interface presentation that presents the first-part image and said one or more second-part output images, the user interface presentation including one or more graphical prompts that allow a user to select any of said one or more second-part output images; and displaying the user interface presentation on a display device, for presentation to the user.

2. The one or more computing devices of claim 1, wherein the first-part image shows a first apparel item selected by the user, and each second-part output image shows a second apparel item that complements the first apparel item.

3. The one or more computing devices of claim 1, wherein each instance of second-part generated image information describes features associated with a generated second-part image.

4. The one or more computing devices of claim 1, wherein each instance of second-part generated image information describes pixels associated with a generated second-part image.

5. The one or more computing devices of claim 1, wherein the operations further include selecting the generator component from among a set of generator components implemented by the hardware logic circuitry, each generator component being associated with a pair of complementary item types.

6. The one or more computing devices of claim 1, wherein the operations further include applying two or more generator components implemented by the hardware logic circuitry, each generator component being associated with a pair of complementary item types.

7. The one or more computing devices of claim 1, wherein said retrieving comprises:
identifying one or more second-part extracted images that match any of said one more instances of second-part generated image information; and
identifying said one or more second-part output images as one or more respective images that match any of said one or more second-part extracted images, each second-part output image showing an image of a selectable product.

8. The one or more computing devices of claim 1, wherein the training system produces the generator component by:
identifying a set of composite images, each composite image being composed of at least a particular first-part image and a particular second-part image;
segmenting the composite images to generate a plurality of first-part extracted images and a plurality of second-part extracted images; and
using the cGAN to train the generator component based on the plurality of first-part extracted images and the plurality of second-part extracted images.

9. The one or more computing devices of claim 8, wherein said using the cGAN comprises, for a plurality of instances of first-part image information:

using the generator component to map a particular instance of first-part image information, together with a particular instance of random information taken from a distribution into an instance of second-part generated image information;
using a discriminator component implemented by the hardware logic circuitry to provide a score which reflects a level of confidence that the particular instance of second-part generated image information is representative of a real preexisting second-part image; and
based at least on the score, adjusting weight values of the generator component and the discriminator component.

10. The one or more computing devices of claim 8, wherein said using the cGAN comprises, for a particular instance of first-part image information:
using the generator component to map the particular instance of first-part image information into a particular instance of second-part generated image information;
using a discriminator component implemented by the hardware logic circuitry to provide a score which reflects a level of confidence that the particular instance of second-part generated image information is representative of a real preexisting second-part image,
the discriminator component operating on combined image information that depends on a mix of the particular instance of second-part generated information produced by the generator component and an actual instance of second-part image information, the combined image information being considered real or generated based on a value that governs the mix.

11. The one or more computing devices of claim 1,
wherein said one or more one or more instances of second-part generated image information generated by the generator component include plural instances of second-part generated image information, and
wherein the generator component produces the plural instances of second-part image information based on the first-part image information and plural respective instances of random information.

12. The one or more computing devices of claim 1, wherein the user interface presentation also displays said one or more instances of second-part generated image information.

13. A method for retrieving one or more output images, implemented by one or more computing devices, comprising:
identifying a first-part image in response to at least one input signal provided by a user, using an input device;
receiving first-part image information that describes the first-part image;
using a generator component implemented by said one or more computing devices to transform, using a neural network, the first-part image information into one or more instances of second-part generated image information, each instance of second-part generated image information complementing the first-part image information and being fake image information created by the generator component rather than being retrieved from a preexisting empirical distribution of images;
retrieving one or more second-part output images from a data store, based on said one more instances of second-part generated image information;
generating a user interface presentation that presents the first-part image and said one or more second-part output images, the user interface presentation including one or more graphical prompts that allow a user to select any of said one or more second-part output images; and displaying the user interface presentation on a display device, for presentation to the user, the generator component having been trained by a computer-implemented training system using a conditional generative adversarial network (cGAN) by:

identifying a set of composite images, each composite image being composed of at least a particular first-part image and a particular second-part image;

segmenting the composite images to generate a plurality of first-part extracted images and a plurality of second-part extracted images; and using the cGAN to train the generator component based on the plurality of first-part extracted images and the plurality of second-part extracted images.

14. The method of claim 13, wherein the first-part image that is identified shows a first apparel item selected by a user, and each second-part output image that is retrieved shows a second apparel item that complements the first apparel item.

15. The method of claim 14, wherein the first apparel item is an upper-body apparel item, and the second apparel item is a lower-body apparel item.

16. The method of claim 13, wherein the first-part image that is identified shows a first selectable product item selected by a user, and each second-part output image that is retrieved shows a second selectable product item that complements the first selectable product item.

17. The method of claim 13, wherein each instance of second-part generated image information describes features associated with a generated second-part image.

18. The method of claim 13, wherein each instance of the second-part generated image information describes pixels associated with a generated second-part image.

19. The method of claim 13, wherein the method further includes selecting the generator component from among a set of generator components implemented by said one or more computing devices, each generator component being associated with a pair of complementary item types.

20. The method of claim 13, wherein the method further includes applying two or more generator components implemented by said one or more computing devices, each generator component being associated with a pair of complementary item types.

21. The method of claim 13, wherein said retrieving comprises:

identifying one or more second-part extracted images that match any of said one more instances of second-part generated image information; and identifying said one or more second-part output images as one or more respective images that match any of said one or more second-part extracted images, each second-part output image showing an image of a selectable product.

22. The method of claim 13, wherein said using the cGAN comprises, for a plurality of instances of first-part image information:

using the generator component to map a particular instance of first-part image information, together with an instance of random information taken from a distribution, into a particular instance of second-part generated image information;

using a discriminator component implemented by said one or more computing devices to provide a score which reflects a level of confidence that the particular instance of second-part generated image information is representative of a real preexisting second-part image; and based at least on the score, adjusting weight values of the generator component and the discriminator component.

23. A computer-readable storage medium for storing computer-readable instructions, the computer-readable instructions, when executed by one or more hardware processors, performing a method that comprises:

identifying, using a matching component, a set of composite images, each composite image being composed of at least a first-part image and a second-part image;

segmenting the composite images to generate a plurality of first-part extracted images and a plurality of second-part extracted images; and using a conditional generative adversarial network (cGAN) to train a generator component based on the plurality of first-part extracted images and the plurality of second-part extracted images, wherein said using the cGAN comprises, for a plurality of instances of first-part image information:

using the generator component to map an instance of first-part image information, together with an instance of random information taken from a distribution, into an instance of second-part generated image information;

using a discriminator component to provide a score which reflects a level of confidence that the instance of second-part generated image information is representative of a real preexisting second-part image; and based at least on the score, adjusting weight values of the generator component and the discriminator component, the matching component, generator component, and discriminator component being implemented by the computer-readable instructions.

* * * * *